(12) United States Patent
Zhang (10) Patent No.: US 11,244,170 B2
(45) Date of Patent: Feb. 8, 2022

(54) SCENE SEGMENTATION METHOD AND DEVICE, AND STORAGE MEDIUM (71) Applicant: BEIJING DAJIA INTERNET INFORMATION TECHNOLOGY CO., LTD., Beijing (CN)

(72) Inventor: Yuan Zhang, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 10 days.

(21) Appl. No.: 16/872,528

(22) Filed: May 12, 2020

(65) Prior Publication Data

US 2020/0272825 A1 Aug. 27, 2020

(30) Foreign Application Priority Data

May 27, 2019 (CN) .......................... 201910446505.3

(51) Int. Cl.
*G06K 9/62* (2006.01)
*G06K 9/00* (2006.01)
(Continued)

(52) U.S. Cl.
CPC .......... *G06K 9/00765* (2013.01); *G06N 3/08* (2013.01); *G06T 7/10* (2017.01); *G06T 2207/20081* (2013.01); *G06T 2207/20084* (2013.01)

(58) Field of Classification Search
CPC .......... G06N 3/08; G06N 7/005; G06N 20/00; G06N 3/0445; G06N 5/046; G06N 5/025;
(Continued)

(56) References Cited

U.S. PATENT DOCUMENTS

| 2018/0260956 A1* | 9/2018 | Huang | B60W 30/10 |
| 2019/0050667 A1* | 2/2019 | Wang | G06K 9/4604 |
| 2019/0370648 A1* | 12/2019 | Zoph | G06N 20/00 |

FOREIGN PATENT DOCUMENTS

| CN | 108154153 A | 6/2018 |
| CN | 1085110535 A | 9/2018 |

(Continued)

OTHER PUBLICATIONS

Liang-Chieh Chen, "Encoder-Decoder with Atrous Separable Convolution for Semantic Image Segmentation," Springer Nature Switzerland AG (2018) Google Inc., Mountain View, USA.

*Primary Examiner* — Quan M Hua
(74) *Attorney, Agent, or Firm* — Meunier Carlin & Curfman LLC (57) ABSTRACT

A scene segmentation method and device, and a storage medium. In the present disclosure, an image to be identified is inputted into a deep neural network, depthwise separable convolution is performed on the image by using a down-sampling module to obtain a first characteristic image smaller than the image in size, atrous convolution is performed on the first characteristic image by using an atrous spatial pyramid pooling module to obtain second characteristic images with different scales, and depthwise separable convolution is performed on the second characteristic images with different scales by using an up-sampling module to obtain a third characteristic image with the same size as the image, and pixels in the third characteristic image are classified by using a classification module to obtain a scene segmentation result of the image.

15 Claims, 6 Drawing Sheets

(51) Int. Cl.
*G06T 7/10* (2017.01)
*G06N 3/08* (2006.01)

(58) Field of Classification Search
CPC ...... G06N 3/02; G06K 9/6267; G06K 9/4628; G06K 9/6232; G06K 9/6256; G06K 9/6257; G06K 2209/05; G06K 9/6259; G06K 9/6262; G06K 9/628; G06K 9/6263; G06K 9/036; G06K 9/6202; G06K 9/6218; G06K 9/6222; G06K 9/6271; G06K 9/6272; G06K 9/6277; G06K 9/00664; G06K 9/34; G06K 9/627; G06K 9/726; G06K 2009/366; G06K 2209/21; G06K 9/00201; G06K 9/46; G06K 9/4604; G06K 9/6268; G06K 2209/27; G06K 7/1413; G06K 7/1417; G06K 9/00765; G06K 9/00771; G06K 9/00791; G06K 9/00805; G06K 9/2054; G06K 9/3233; G06K 9/3241; G06K 9/4633; G06K 9/4671; G06K 9/6212; G06K 9/6273; G06K 9/6292; G06T 2207/20084; G06T 9/002; G06T 1/0014; G06T 7/596

See application file for complete search history.

(56) References Cited

FOREIGN PATENT DOCUMENTS

| CN | 108985269 A | 12/2018 |
|----|-------------|---------|
| CN | 109145920 A | 1/2019  |
| CN | 109325534 A | 2/2019  |

* cited by examiner

Fig. 10

SCENE SEGMENTATION METHOD AND DEVICE, AND STORAGE MEDIUM

CROSS-REFERENCE TO RELATED APPLICATION

This application claims priority of Chinese Patent Application No. 201910446505.3, filed on May 27, 2019, which is hereby incorporated by reference in its entirety.

FIELD

The present disclosure relates to the machine learning field, and in particular to, a scene segmentation method and device, a computer device, and a storage medium.

BACKGROUND

Scene segmentation is a technology that predicts a scene to which each pixel belongs in a given image. Scene segmentation has become an important and challenging research direction at present, can be applied to various fields such as augmented reality, virtual reality, and hybrid reality, and has completely broad application prospects.

In the related technology, a method of scene segmentation may include: obtaining a large quantity of sample images, wherein each pixel of each sample image is labeled with a scene to which the pixel belongs; constructing an initial deep neural network, and using the sample image to perform model training on the initial deep neural network, to obtain a deep neural network; and when scene segmentation needs to be performed on an image, calling the deep neural network, inputting the image to the deep neural network, and performing computation on the image by using the deep neural network, to obtain a scene segmentation result of the image.

SUMMARY

According to a first aspect of embodiments of the present disclosure, a scene segmentation method is provided, including:

obtaining an image to be identified;

inputting the image into a deep neural network, wherein the deep neutral network includes a down-sampling module, an atrous spatial pyramid pooling module, an up-sampling module, and a classification module, and both the down-sampling module and the up-sampling module use a depthwise separable convolution structure; and performing a depthwise separable convolution on the image by using the down-sampling module, to obtain a first characteristic image smaller than the image in size, and performing atrous convolution on the first characteristic image by using the atrous spatial pyramid pooling module, to obtain second characteristic images with different scales, performing depthwise separable convolution on the second characteristic images with different scales by using the up-sampling module, to obtain a third characteristic image with the same size as the image, and classifying pixels in the third characteristic image by using the classification module, to obtain a scene segmentation result of the image.

According to a second aspect of the embodiments of the present disclosure, a scene segmentation device is provided, including:

at least one processor; and at least one memory configured to store a processor-executable instruction, wherein the processor is configured to execute the processor-executable instruction to realize the above scene segmentation method.

According to a third aspect of the embodiments of the present disclosure, a storage medium is provided, and in response to an instruction in the storage medium is executed by a processor of a computer device, the computer device performs the above scene segmentation method.

According to a fourth aspect of the embodiments of the present disclosure, a computer program product including one or more instructions is provided, and in response to that the one or more instructions are executed by a processor of a computer device, the computer device performs the above scene segmentation method.

BRIEF DESCRIPTION OF THE DRAWINGS

The drawings herein are incorporated in the specification and constitute a part of the specification, illustrate embodiments consistent with the present disclosure, and are used together with the specification to explain principles of the present disclosure, and do not constitute an improper limitation on the present disclosure.

DETAILED DESCRIPTION OF THE EMBODIMENTS

To enable those of ordinary skill in the art to better understand the technical solutions of the present disclosure, the technical solutions in the embodiments of the present disclosure are clearly and completely described below with reference to the accompanying drawings.

It should be noted that terms "first" and "second" in the specification and claims of the present disclosure and the above accompanying drawings are used to distinguish similar objects, and are not necessarily used to describe a specific order or sequence. It should be understood that data used in this way may be interchanged in an appropriate case, so that the embodiments of the present disclosure described herein can be implemented in an order other than those illustrated or described herein. The implementations described in the following exemplary embodiments do not represent all implementations consistent with the present disclosure, and oppositely are merely examples of devices and methods consistent with some aspects of the present disclosure as described in detail in the appended claims.

Some terms involved in the present disclosure are explained below.

Depthwise separable convolution is a convolution manner that can reduce an amount of computation, and depthwise separable convolution can be deemed to be a simplified convolution. Depthwise separable convolution divides the standard convolution computation into depthwise convolution and pointwise convolution (that is, 1*1 convolution). Depthwise separable convolution can keep different channels separated from each other while performing convolution in a depth direction. When depthwise separable convolution is performed, firstly, the depthwise convolution is independently performed on each channel, so that a width of a network is increased, and extracted features are richer, and then the pointwise convolution is performed on a result of the depthwise convolution, so that multiple channels subjected to the depthwise convolution are mapped to new channels. In terms of a quantity of parameters, for a convolution kernel of a size 3×3, if input channels are 16, and output channels are 32, an operation of the standard convolution is to use 32 convolution kernels of a size of 3×3 to respectively perform convolution computation on data of one input channel, so that (3×3×16)×32=4068 parameters are used in the entire process. When depthwise separable convolution is performed, 16 convolution kernels of a size 3×3 are used to respectively perform convolution computation on data of 16 input channels, so that 3×3×16+(1×1×16)×32=656 parameters are used in the entire process. In this way, compared with the standard convolution, the quantity of parameters and computational complexity of depthwise separable convolution can be reduced by 8 to 9 times. When a quantity of channels is larger, a quantity of reduced parameters is larger. It can be learned that depthwise separable convolution can greatly reduce the quantity of parameters on the basis of implementing a convolution function.

Dilated convolution (dilated conv) is also known as atrous convolution, the so-called dilation refers to perform sampling on an input image, and the frequency of sampling, that is, a dilation size, is determined according to a dilation rate. When the dilation rate is 1, atrous convolution is standard convolution operation, and information of an input image is not lost during convolution. However, when the dilation rate is greater than 1, atrous convolution is to perform sampling on the input image at an interval of every one or more pixels and to use multiple pixels obtained by sampling as a receptive field for performing convolution, and then a size of an output image obtained by convolution is smaller than that of the input image. For example, when the dilation rate is equal to N, sampling is performed on the input image at an interval of every (N−1) pixels, and convolution is performed by using multiple pixels obtained by sampling as a receptive field, where N is a positive integer. From a perspective of the convolution kernel, atrous convolution can be understood as inserting (the dilation rate−1) 0 between adjacent points in the convolution kernel, so that the size of the convolution kernel is dilated, and convolution is performed by using the dilated convolution kernel and the input image, to increase the receptive field.

Atrous spatial pyramid pooling (ASPP) is a method for providing multi-scale characteristic images. To implement a function of obtaining the multi-scale characteristic images, ASPP adds a series of atrous convolutions of different dilation rates. Different dilation rates are used to capture receptive fields with different scales, and atrous convolution of each dilation rate can obtain a characteristic image of one scale.

Figure 1:
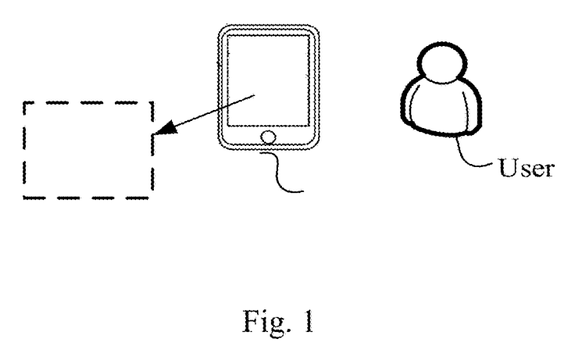
FIG. 1 is a schematic diagram of an application scene according to an exemplary embodiment.

FIG. 1 is a schematic diagram of an application scene according to an exemplary embodiment. As shown in FIG. 1, a deep neural network can be deployed in a terminal 100. A user can input an image to be identified on the terminal 100. The terminal 100 can input the image into the deep neural network, obtains a scene segmentation result by running the deep neural network, and presents the scene segmentation result to a user.

The terminal 100 may be a mobile terminal such as at least one of a smart phone, a game console, a tablet computer, an e-book reader, an MP3 player, an MP4 player, and a laptop portable computer. Certainly, the terminal 100 may also be a non-mobile terminal, such as a desktop computer. The terminal 100 can install and run an application that supports scene segmentation. The application may be any one of an image processing application, a social application, an instant messaging application, a shopping application, a browser program, and a video program. Schematically, the application can be associated with a scene segmentation platform. After the user has registered and logged in the scene segmentation platform, the user can use a scene segmentation service provided by the scene segmentation platform. The scene segmentation platform can deliver the deep neural network to the terminal 100. The terminal 100 may receive the deep neural network from the scene segmentation platform, so as to perform scene segmentation by using the deep neural network.

Figure 2:
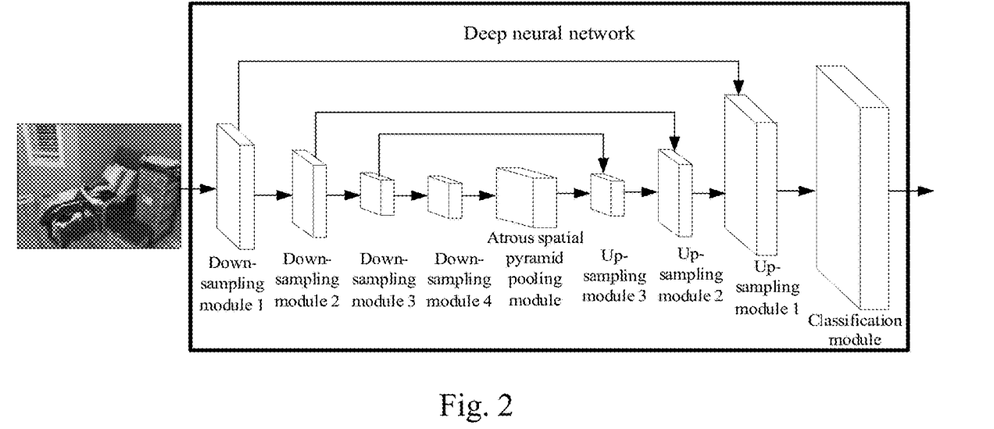
FIG. 2 is a flowchart of a scene segmentation process according to an exemplary embodiment.

FIG. 2 is a flowchart of a scene segmentation process according to an exemplary embodiment. Referring to FIG. 2, an entire scene segmentation process is implemented by using a deep neural network. The deep neural network includes a down-sampling module, an atrous spatial pyramid pooling module, an up-sampling module, and a classification module. The down-sampling module is connected to the atrous spatial pyramid pooling module, the atrous spatial pyramid pooling module is connected to the up-sampling module, and the up-sampling module is connected to the classification module.

There may be one or more down-sampling modules. If there are multiple down-sampling modules, each down-sampling module can be configured to perform down-sampling for one time, and the multiple down-sampling modules can perform down-sampling for multiple times. The multiple down-sampling modules can be connected in series, and an output of a current down-sampling module is an input of a next down-sampling module. Schematically, referring to FIG. 2, there may be four down-sampling modules, and the four down-sampling modules may perform down-sampling for four times. An output of a down-sampling module 1 is an input of a down-sampling module 2, an output of the down-sampling module 2 is an input of a down-sampling module 3, and an output of the down-sampling module 3 is an input of a down-sampling module 4.

Each down-sampling module can be a convolutional layer with a stride greater than 1, and the down-sampling module can implement a function of down-sampling by performing convolution by using a stride greater than 1. For example, if the down-sampling module is a convolutional layer with a stride of 2, and the down-sampling module performs convolution by using 2 as a stride, a size of an output characteristic image is one half of a size of an input characteristic image.

The down-sampling module can use a depthwise separable convolution structure. For example, each down-sampling module may be a convolutional layer for which a depthwise separable convolution structure is adopted. For any down-sampling module, the down-sampling module may first perform convolution computation in a depthwise convolution manner, and then fuse results of the depthwise convolution in a 1×1 convolution manner. A function of compressing the down-sampling module is implemented by using a depthwise separable convolution structure, and a quantity of parameters and computation complexity of the down-sampling module can be greatly reduced, so that an amount of computation is reduced when the down-sampling module runs, and the down-sampling module becomes more lightweight.

There may be one or more up-sampling modules. If there are multiple up-sampling modules, each up-sampling module can be configured to perform up-sampling for one time, and the multiple down-sampling modules can perform down-sampling for multiple times. The multiple up-sampling modules can be connected in series, and an output of a current up-sampling module is an input of a next up-sampling module. Schematically, referring to FIG. 2, there may be three up-sampling modules, and the three up-sampling modules may perform up-sampling for three times. An output of an up-sampling module 3 is an input of an up-sampling module 2, and an output of the up-sampling module 2 is an input of an up-sampling module 1.

Each up-sampling module may include a convolutional layer and an up-sampling layer, and the convolutional layer may be connected to the up-sampling layer. A convolutional layer in the up-sampling module may use a depthwise separable convolution structure, and a stride of the convolutional layer may be equal to 1. The up-sampling module can first perform convolution by using a convolutional layer with a stride of 1, and then perform up-sampling on a characteristic image obtained by convolution by using the up-sampling layer, to implement a function of up-sampling.

The convolutional layer in the up-sampling module can further be connected to a previous up-sampling module, and the up-sampling layer in the up-sampling module can further be connected to a next up-sampling module. For example, a convolutional layer in a first up-sampling module can further be connected to the atrous space pyramid pooling module, and an up-sampling layer in the first up-sampling module can further be connected to a second up-sampling module. A convolutional layer in a last up-sampling module can be connected to a penultimate up-sampling module, and an up-sampling layer in the last up-sampling module can be connected to the classification module.

The up-sampling module may use depthwise separable convolution structure. Specifically, each up-sampling module in the up-sampling modules may be a convolutional layer that uses depthwise separable convolution structure. For any up-sampling module, the up-sampling module can first perform convolution computation in a depthwise convolution manner, and then fuse results of the depthwise convolution in a 1×1 convolution manner. A function of compressing the up-sampling module is implemented by using depthwise separable convolution structure, and a quantity of parameters and computational complexity of the up-sampling module can be greatly reduced, so that an amount of computation is reduced when the up-sampling module runs, and the up-sampling module becomes more lightweight.

Both the down-sampling module and the up-sampling module use depthwise separable convolution structure, so that the deep neural network is greatly compressed, ensuring that the data volume of the deep neural network is smaller, and the running speed of the deep neural network is faster. Then for a mobile terminal with a limited computing processing capability, such a deep neural network with a small amount of computation is designed, so that the deep neural network can meet the computing capability of the mobile terminal. In this way, the mobile terminal can also freely run the deep neural network, and scene segmentation can be performed by the deep neural network without relying on interaction with a server, so that scene segmentation is speeded up, and efficiency of scene segmentation is improved.

In an exemplary scene, the deep neural network provided by the present disclosure can be deployed on a smart phone, and the smart phone can run the deep neural network to perform scene segmentation on an image input by a user in real time.

In some possible embodiments, the up-sampling module in the deep neural network and the down-sampling module may be connected in a cross-layer manner. For example, in FIG. 2, the up-sampling module 1 is connected to the down-sampling module 1, the up-sampling module 2 is connected to the down-sampling module 2, and the up-sampling module 3 is connected to the down-sampling module 3. An up-sampling module 1 can be connected to a down-sampling module j, i and j are equal, and are integers, and in terms of an order from an input layer to an output layer, index numbers of the up-sampling modules are sorted in an ascending order, and index numbers of the down-sampling modules are sorted in a descending order.

By the use of cross-layer connection, for any up-sampling module, the up-sampling module can learn high-level semantics through a characteristic image outputted by a previous up-sampling module, and can also learn low-level semantics through a first characteristic image outputted by a down-sampling module connected to the up-sampling module in a cross-layer manner. In this way, the high-level semantics and the low-level semantics can be combined, and a convolutional layer in the up-sampling module can learn features of the high-level semantics and features of the low-level semantics, so that the requirements for the high-level semantics and the low-level semantics by a scene segmentation process are met, and accuracy of performing scene segmentation by the deep neural network can be improved. In addition, a down-sampling module at a front end of the deep neural network is connected to an up-sampling module at a back end of the deep neural network, the up-sampling module at the back end of the deep neural network reuses features of the front end of the deep neural network, and it can be guaranteed, by reusing the features, that a small quantity of convolution kernels can generate a large quantity of features, so that a size of the model is reduced.

Figure 3:
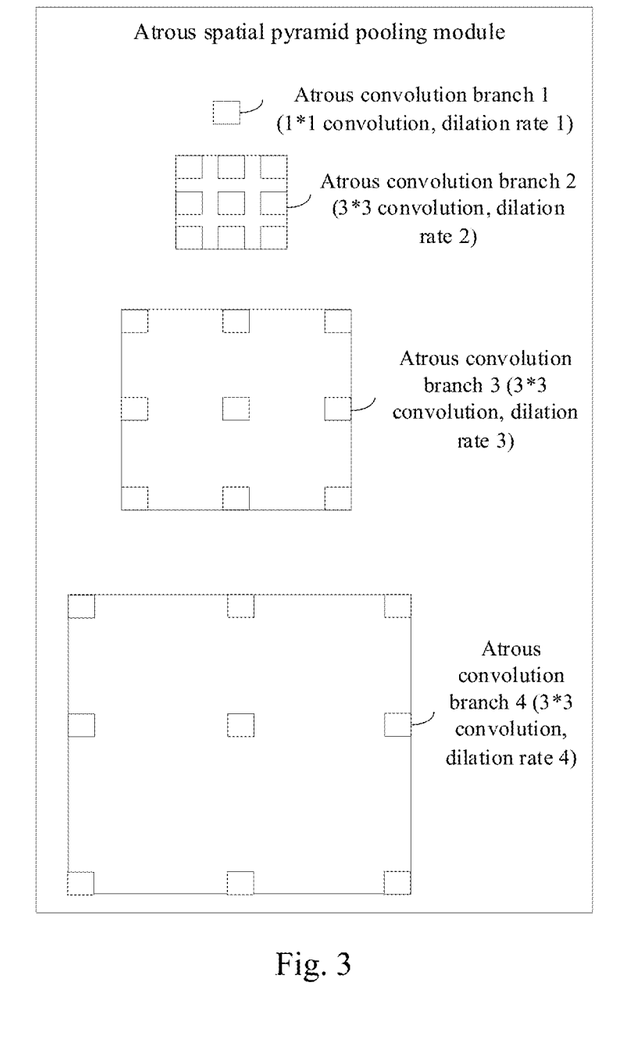
FIG. 3 is a schematic structural diagram of an atrous spatial pyramid pooling module according to an exemplary embodiment.

In some possible embodiments, referring to FIG. 3, an atrous spatial pyramid pooling module may include multiple atrous convolution branches, and each atrous convolution branch is used to obtain a characteristic image of a scale. For example, each atrous convolution branch can correspond to a dilation rate, when each atrous convolution branch performs atrous convolution based on the corresponding dilation rate, a receptive field of a scale can be captured, and after convolution is performed on the receptive field of the corresponding scale, a characteristic image of a scale can be obtained. Dilation rates of different atrous convolution branches can be different, so that when atrous convolution is performed by using different atrous convolution branches, receptive fields with different scales can be captured. In addition, the multiple atrous convolution branches can be connected in parallel, and atrous convolution processes of the multiple atrous convolution branches can be independent of each other, so that the multiple atrous convolution branches can perform computation in parallel.

For example, if the dilation rate of an atrous convolution branch is N, the atrous convolution branch can perform sampling on the input characteristic image at an interval of every (N−1) pixels, and the sampled pixels are used as receptive fields, so that convolution computation is performed on the receptive fields. As shown in FIG. 3, the atrous spatial pyramid pooling module may include 4 atrous convolution branches. An atrous convolution branch 1 is used for performing 1*1 atrous convolution based on a dilation rate 1, and an atrous convolution branch 2 is used for performing 3*3 atrous convolution based on a dilation rate 2, an atrous convolution branch 3 is used for performing 3*3 atrous convolution based on a dilation rate 3, and an atrous convolution branch 4 is used for performing 3*3 atrous convolution based on a dilation rate 4. Exemplarily, if the dilation rate 1 can be 1, the dilation rate 2 can be 2, the dilation rate 3 can be 4, and the dilation rate 4 can be 8, scales of receptive fields captured by the atrous convolution branch 1, the atrous convolution branch 2, and the atrous convolution branch 3, and the atrous convolution branch 4 sequentially increase.

The above atrous spatial pyramid pooling module can implement a function of obtaining characteristic images of multiple scales. In addition, the atrous spatial pyramid pooling module performs atrous convolution by using atrous convolution branches with different dilation rates, receptive fields with different scales can be captured, so that it can be ensured that the deep neural network can learn detailed information of an input characteristic image through the receptive field with a small range, and can learn global information of the input characteristic image through the receptive field with a large range, thereby avoiding loss of the detailed information of the input characteristic image, for example, spatial position information of some objects. In this way, accuracy of scene segmentation is ensured, and loss of resolution of a feature space can be avoided at the same time.

In addition, the size of the input image of the deep neural network provided by the present disclosure is small, a quantity of layers of the deep neural network is small, a quantity of convolution kernels is small, and a dimension of each layer is relatively low, so that a size of a model can be reduced, complexity can be reduced, a running speed of the model can be improved, and the model is more suitable for being deployed on a mobile terminal. In addition, compared with a graph theory-based segmentation method that relies on selected initial seed points to perform scene segmentation, and requires the initial seed points to be set in advance, the present disclosure has the characteristics that when the deep neural network performs scene segmentation, an initial seed point does not need to be set in advance, so that self-adaptive segmentation is implemented.

Based on the above modules, an image is inputted to the deep neural network. First, depthwise separable convolution is performed on the image by using the down-sampling module to obtain a characteristic image. In a depthwise separable convolution process, because a stride of convolution is greater than 1, a size of the characteristic image outputted by convolution is smaller than a size of the input image. Then, the characteristic image outputted by the down-sampling module is inputted to the atrous spatial pyramid pooling module, and atrous convolution in different dilation rates is performed by using the atrous spatial pyramid pooling module to obtain characteristic images of receptive fields with different scales. Afterwards, an output of the atrous spatial pyramid pooling module is inputted to the up-sampling module to restore the characteristic image to the size of the input image. Finally, the characteristic image is classified pixel by pixel by the classification module to obtain a scene segmentation result.

Figure 4:
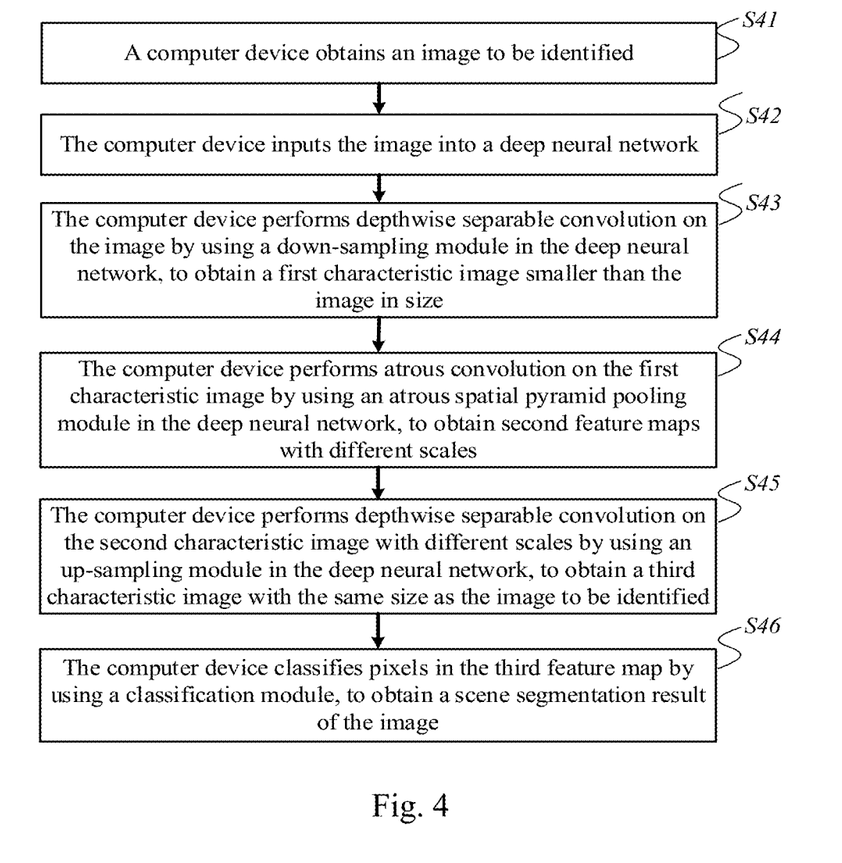
FIG. 4 is a flowchart of a scene segmentation method according to an exemplary embodiment.

Based on the model architecture and the brief flowchart shown in FIG. 2, a flowchart of a scene segmentation method as shown in FIG. 4 is provided below. The embodiment of the present disclosure is described by using an example in which only a computer device is used as an execution body. The computer device may be implemented as a terminal 100 shown in FIG. 1 in an implementation environment, for example, the computer device may be a mobile terminal. Certainly, the computer device may be a device other than the terminal 100, for example, the computer device may be at least one of a server, multiple servers, or a cloud computing platform, and a virtualization center. Referring to FIG. 4, the method includes following steps.

In S41: A computer device obtains an image to be identified.

The image to be identified may also be referred to as an original image, and the image to be identified may be a scene image, such as an indoor scene image. For example, the image to be identified may include at least one of a wall image, a ground image, and a ceiling image. The computer device may store the image to be identified in advance, or may receive an image to be identified inputted by a user. For example, the user may input an image to be identified by triggering an input operation on the computer device.

In S42: the computer device inputs the image into a deep neural network.

In S43: the computer device performs depthwise separable convolution on the image by using a down-sampling module in the deep neural network to obtain a first characteristic image smaller than the image in size.

The first characteristic image refers to a characteristic image obtained by performing depthwise separable convolution on the image to be identified by using the down-sampling module. The first characteristic image may indicate semantics of the image to be identified, and may be referred to as a semantic characteristic image. The down-sampling module can be a convolutional layer with a stride greater than 1, the convolutional layer uses a depthwise separable convolution structure, the down-sampling module performs depthwise separable convolution based on a stride greater than 1, and a size of the output first feature image is smaller than a size of the input image to be identified, so that a function of down-sampling is implemented. A width of the first characteristic image may be smaller than a width of the image to be identified, and a height of the first characteristic image may be smaller than a height of the image to be identified. Exemplarily, if a stride of the down-sampling module is 2, the size of the first characteristic image is half of the size of the image to be identified, and if the stride of the down-sampling module is 4, the size of the first characteristic image is a quarter of the size of the image to be identified.

In some possible embodiments, there may be multiple down-sampling modules, and the computer device may use the multiple down-sampling modules to perform down-sampling on the image to be identified for multiple times. For example, the image to be identified may be subjected to down-sampling for four times. A characteristic image outputted by a current down-sampling module can be inputted to a next down-sampling module, and depthwise separable convolution is performed on the first characteristic image outputted by the current down-sampling module by using the next down-sampling module, so that the first characteristic image outputted by a current up-sampling module is subjected to up sampling. Optionally, a first down-sampling module can perform depthwise convolution on an input image, and then fuse results of the depthwise convolution by using 1×1 convolution to output a first characteristic image; each down-sampling module from a second down-sampling module to a last down-sampling module can perform depthwise convolution on the first characteristic image outputted by a previous down-sampling module, and then fuse results of depthwise convolution by using 1×1 convolution. For example, referring to FIG. 2, if a stride of a down-sampling module is 2, depthwise separable convolution can be first performed on an image to be identified by using a down-sampling module 1 to obtain a characteristic image 1, and a size of the characteristic image 1 is half of a size of the image to be identified. Then, the characteristic image 1 is inputted to a down-sampling module 2, and depthwise separable convolution is performed on the characteristic image 1 by using the down-sampling module 2 to obtain a characteristic image 2, and a size of the characteristic image 2 is half of the size of the characteristic image 1. Then, the characteristic image 2 is inputted to a down-sampling module 3, and depthwise separable convolution is performed on the characteristic image 2 by using the down-sampling module 3 to obtain a characteristic image 3, and a size of the characteristic image 3 is half of the size of the characteristic image 2. Then, the characteristic image 3 is inputted to a down-sampling module 4, and depthwise separable convolution is performed on the characteristic image 3 by using the down-sampling module 4 to obtain a characteristic image 4, the characteristic image 4 is the first characteristic image, and a size of the characteristic image 4 is half of the size of the characteristic image 3.

In S44, the computer device performs atrous convolution on the first characteristic image by using an atrous pyramid pooling module in the deep neural network, to obtain second characteristic images with different scales.

The second characteristic image refers to a characteristic image obtained by performing atrous convolution on the first characteristic image by using the atrous spatial pyramid pooling module. There may be multiple second characteristic images, and the scales of the different second characteristic images may be different.

In some possible embodiments, the atrous spatial pyramid pooling module may include multiple atrous convolution branches, and each atrous convolution branch is used to obtain a second characteristic image of a scale. For each of the multiple atrous convolution branches, the computer device can perform atrous convolution on the first characteristic image by using the atrous convolution branch to obtain a second characteristic image of a scale corresponding to the atrous convolution branch, then the multiple atrous convolution branches output the second characteristic images with different scales.

Exemplarily, the atrous spatial pyramid pooling module may include four atrous convolution branches, a dilation rate of an atrous convolution branch 1 is 1, a dilation rate of an atrous convolution branch 2 is 2, a dilation rate of an atrous convolution branch 3 is 4, and a dilation rate of an atrous convolution branch 4 is 8. Standard convolution can be performed on the first characteristic image by using the atrous convolution branch 1 to obtain a second characteristic image of a scale. Atrous convolution is performed on the first characteristic image by using the atrous convolution branch 2 by using the dilation rate of 2 to obtain a second characteristic image of another scale. Atrous convolution is performed on the first characteristic image by using the atrous convolution branch 3 by using the dilation rate of 4 to obtain a second characteristic image of another scale. Atrous convolution is performed on the first characteristic image by using the atrous convolution branch 3 by using the dilation rate of 8 to obtain a second characteristic image of another scale.

After the multiple atrous convolution branches output second characteristic images with different scales, the second characteristic images with different scales can be separately subjected to up sampling, so that the second characteristic images with different scales are converted into multiple second characteristic images with the same scale, the multiple second characteristic images are in connection (concat), and the second characteristic images in connection are inputted to an up-sampling module, so as to perform the following S45.

In S45: the computer device performs depthwise separable convolution on the second characteristic images with different scales by using an up-sampling module in the deep neural network to obtain a third characteristic image with the same size as the image to be identified.

The third characteristic image refers to a characteristic image obtained by performing depthwise separable convolution on the second characteristic images by using the up-sampling module. The size of the third characteristic image is larger than sizes of the second characteristic images, for example, a width of the third characteristic image may be greater than widths of the second characteristic images, and a height of the third characteristic image may be greater than heights of the second characteristic images. The size of the third characteristic image may be the same as the size of the image to be identified, for example, the width of the third characteristic image may be the same as a width of the image to be identified, and the height of the third characteristic image may be the same as a height of the image to be identified.

The image to be identified can be reduced by being processed by the down-sampling module, and can be enlarged by being processed by the up-sampling module. In this way, based on that the characteristic images of multiple scales are obtained, it can be ensured that the scale of the final output characteristic image (the third characteristic image) is restored to the size of the image to be identified that is initially inputted to a model.

In some possible embodiments, there may be multiple up-sampling modules, and the computer device may use at least one up-sampling module to perform up sampling on the second characteristic images for at least one time. For example, the second characteristic images may be subjected to up sampling for three times. A second characteristic image outputted by a current up-sampling module can be inputted to a next up-sampling module, and the second characteristic image outputted by the current up-sampling module is subjected to up sampling by the next up-sampling module. Each up-sampling module may include a convolutional layer and an up-sampling layer that use a depthwise separable convolution structure, and a stride of the convolutional layer may be 1. Correspondingly, depthwise separable convolution may be first performed by the convolutional layer, and then the characteristic image obtained by convolution is subjected to up sampling by the up-sampling layer.

Exemplarily, depthwise convolution can be first performed on the second characteristic images by using a first up-sampling module, and then results of the depthwise convolution are fused by using 1×1 convolution, and then the fusion results are subjected to up sampling to output a third characteristic image. Depthwise convolution is performed on the third characteristic image outputted by the first up-sampling module by using a second up-sampling module, then results of the depthwise convolution are fused by using 1×1 convolution, then the fused results are subjected up sampling, and the obtained third characteristic image is outputted to a next module, and so on.

In some possible embodiments, the up-sampling module in the deep neural network and the down-sampling module may be connected in a cross-layer manner. An output of the down-sampling module can be inputted to the up-sampling module through cross-layer connection.

Optionally, there may be multiple up-sampling modules. The up-sampling module includes at least one first up-sampling module and at least one second up-sampling module. An input of the first up-sampling module is a stitching result of a characteristic image outputted by the second up-sampling module and the first characteristic image. The second up-sampling module is a previous up-sampling module of the first up-sampling module. For example, the first up-sampling module may be an up-sampling module 2, and the second up-sampling module may be an up-sampling module 3, and an input of the up-sampling module 2 is a stitching result of a characteristic image outputted by the up-sampling module 3 and a first characteristic image outputted by the down-sampling module 2. Similarly, the first up-sampling module can be an up-sampling module 1, the second up-sampling module can be an up-sampling module 2, and an input of the up-sampling module 1 is a stitching result of a characteristic image outputted by the up-sampling module 2 and a first characteristic image outputted by the down-sampling module 1.

In addition, an input of the first up-sampling module in the multiple up-sampling modules may be a stitching result of second characteristic images with different scales outputted by the atrous spatial pyramid pooling module and a first characteristic image outputted by a down-sampling module corresponding to the first up-sampling module. For example, referring to FIG. 2, an input of the up-sampling module 3 is a stitching result of a second characteristic image outputted by the atrous spatial pyramid pooling module and a first characteristic image outputted by the down-sampling module 3. For each up-sampling module other than the first up-sampling module in the at least one up-sampling module, an input of the up-sampling module is a stitching result of a characteristic image outputted by a previous up-sampling module and a first characteristic image outputted by a down-sampling corresponding to the up-sampling module.

In S46: the computer device classifies pixels in the third characteristic image by using a classification module to obtain a scene segmentation result of the image.

The scene segmentation result may include classification result of each pixel in the third characteristic image, and the pixel classification result may include two types that the pixel belongs to a scene, and the pixel does not belong to a scene. According to the scene segmentation result, pixels belonging to the scene can be obtained through segmentation, and are used as the scene in the image.

In some possible embodiments, the scene segmentation result may be indicated by a black-and-white binary map. The black-and-white map is also called a mask, or called a binary mask. A size of the black-and-white binary image may be equal to that of an input image. For any pixel in the input image, a color of a corresponding pixel of the pixel in the black-and-white binary map can indicate whether the pixel belongs to a scene. For example, for a pixel X (i, j) in the input image, if a pixel Y (i, j) in the black-and-white binary map is white, it indicates that the pixel X (i, j) belongs to the scene, and If the pixel Y (i, j) in the black-and-white binary map is black, it indicates that the pixel X (i, j) does not belong to the scene, where i and j are integers. In some possible embodiments, the classification module may obtain a probability matrix according to the third characteristic image. Each element in the probability matrix is a probability that a corresponding pixel belongs to a scene. The classification module may mark pixels corresponding to elements greater than or equal to 0.5 in the probability matrix as white, and mark pixels corresponding to elements less than 0.5 in the probability matrix as black, to obtain the black-and-white binary map.

In some possible embodiments, the classification module may be a multi-classifier, and each category of the multi-classifier is a scene. For each pixel in the third characteristic image, the multi-classifier may separately obtain a probability that a pixel is each scene in multiple scenes, and determine a classification result of the pixel according to the probability that the pixel is each scene, and the classification result indicates a scene to which the pixel belongs in the multiple scenes. For example, the multi-classifier can separately obtain a probability that each pixel is a wall, a probability that each pixel is a ground, and a probability that each pixel is a ceiling, and determines a scene segmentation result according to the probability that each pixel is a wall, the probability that each pixel is a ground, and the probability that each pixel is a ceiling, that is, whether the pixel is a wall, a ground, or a ceiling, or a scene other than the wall, the ground, or the ceiling. The pixels that are classified as the wall can be obtained through segmentation to be taken as a wall in an image, the pixels that are classified as a ground are obtained through segmentation to be taken as a ground in the image, and the pixels that are classified as a ceiling are obtained through segmentation to be taken as a ceiling in the image.

Figure 5:
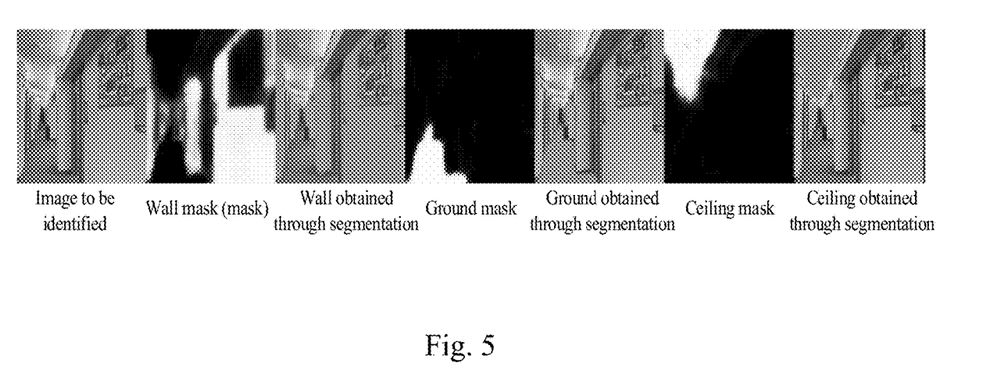
FIG. 5 is a schematic diagram of an effect of a scene segmentation method according to an exemplary embodiment.
Figure 6:
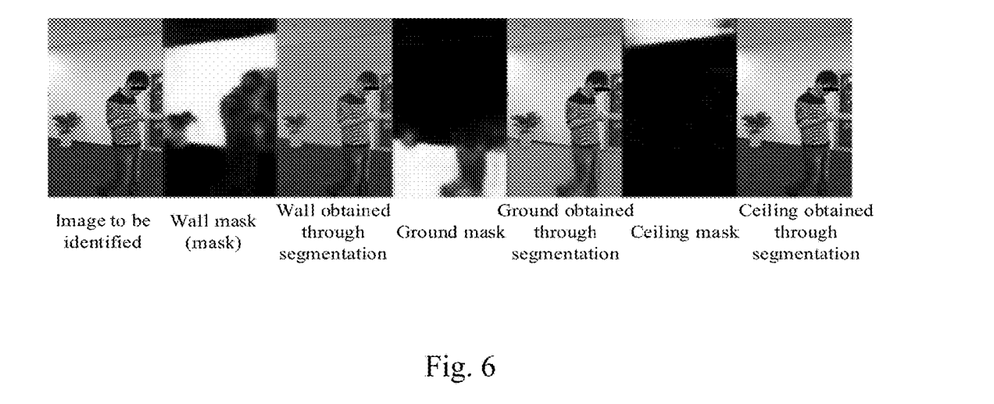
FIG. 6 is a schematic diagram of an effect of another scene segmentation method according to an exemplary embodiment.

Referring to FIG. 5, FIG. 5 is a schematic diagram of an effect of performing scene segmentation on a real image by a deep neural network provided by the present embodiment. In FIG. 5, a first image is an image to be identified, and a second image is a wall mask, white pixels in the second image are a wall, and black pixels are not the wall. A third image in FIG. 5 is a schematic diagram of an effect of a wall obtained through segmentation, a fourth image in FIG. 5 is a ground mask, that is, a black-and-white binary map of a ground, in the fourth image, white pixels are the ground, and black pixels are not the ground. A fifth image in FIG. 5 is a schematic diagram of an effect of a ground obtained through segmentation, a sixth image in FIG. 5 is a ceiling mask, that is, a black-and-white binary image of a ceiling, white pixels in the sixth image are the ceiling, and black pixels are not the ceiling. A seventh image in FIG. 5 is a schematic diagram of an effect of a ceiling obtained through segmentation. FIG. 6 is a schematic diagram of an effect of performing scene segmentation on another real image by using a deep neural network provided by the present embodiment. In FIG. 6, a first image is an image to be identified, and a second image is a wall mask. A third image in FIG. 6 is a schematic diagram of an effect of a wall obtained through segmentation. A fourth image in FIG. 6 is a ground mask, that is, a black-and-white binary image of a ground. A fifth image in FIG. 6 is a schematic diagram of an effect of a ground obtained through segmentation. A sixth image in FIG. 6 is a ceiling mask, that is, a black-and-white binary image of a ceiling. A seventh image in FIG. 6 is a schematic diagram of an effect of a ceiling obtained through segmentation.

It can be learned from FIG. 5 and FIG. 6 that the deep neural network provided by the present disclosure can perform fine segmentation on the wall, floor and ceiling of an indoor scene on the basis of satisfying the computing power of the mobile terminal, and has better robustness for different indoor scenes. In some possible embodiments, the present disclosure can pave the way for the research and application of the most popular technologies such as augmented reality, virtual reality, and mixed reality, and can also help in identification of the indoor scenes, and has broad application prospects.

The method provided by the present embodiment provides a scene segmentation method based on a deep neural network. An image to be identified is input to the deep neural network, and depthwise separable convolution is performed on the image by using a down-sampling module to obtain a first characteristic image smaller than the image in size. Atrous convolution is performed on the first characteristic image by using an atrous spatial pyramid pooling module to obtain second characteristic images with different scales. Depthwise separable convolution is performed on the second characteristic images with different scales by using an up-sampling module to obtain a third characteristic image with the same size as the image. The characteristic image can be restored to the size of the input image to be identified by first performing down sampling and then performing up sampling, then pixels in the third characteristic image are classified by a classification module, and a scene segmentation result of the image can be obtained. In the scene segmentation process, the down-sampling module and the up-sampling module both use a depthwise separable convolution structure, a quantity of parameters of the depthwise separable convolution structure is small and the complexity is low. Therefore, the deep neural network can be greatly compressed, an amount of computation required to run the deep neural network is greatly reduced, and an amount of computation of performing scene segmentation by the deep neural network can be further reduced. In this way, the scene segmentation method can be applied to a mobile terminal, ensuring that the mobile terminal can perform scene segmentation by running the deep neural network. In addition, the deep neural network uses the atrous spatial pyramid pooling module, and the atrous spatial pyramid pooling module can capture receptive fields of various scales, so that the model can learn both detailed information and global information. In this way, loss of detailed information is avoided, and accuracy of performing scene segmentation by the deep neural network is ensured.

In addition, the deep neural network can adopt a cross-layer connection manner. The up-sampling module and the down-sampling module are connected in a cross-layer manner. On the one hand, high-level semantics and low-level semantics are combined, so that the up-sampling module can learn features of the high-level semantics and features of the low-level semantics, requirements for information about the high-level semantics and the low-level semantics in the scene segmentation process are met, and further accuracy of performing scene segmentation by the deep neural network is improved. On the other hand, the up-sampling module reuses the characteristic image outputted by the down-sampling module, so that a large quantity of features can be generated by using a small quantity of convolution kernels, and a size of the deep neural network is reduced.

Figure 7:
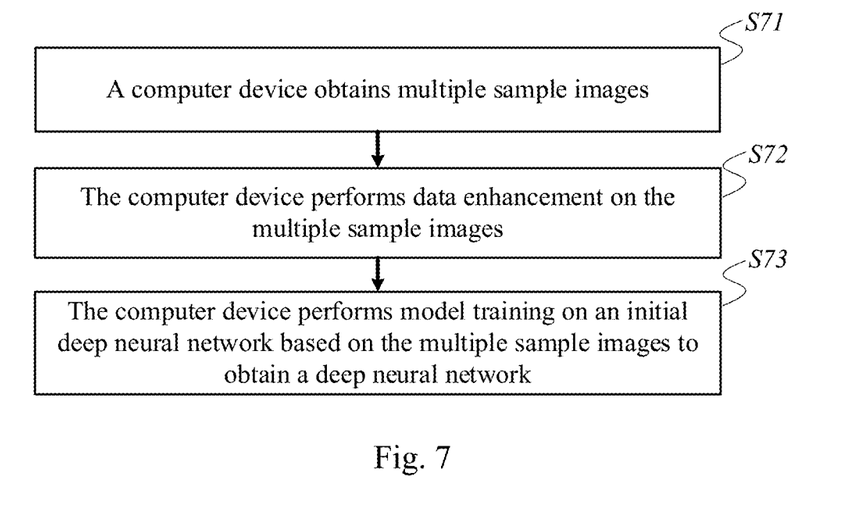
FIG. 7 is a flowchart of a method for training a deep neural network according to an exemplary embodiment.

A method for training a deep neural network provided by an embodiment of the present disclosure is described below. Referring to FIG. 7, the method includes the following steps.

In S71: a computer device obtains multiple sample images, each pixel of each sample image is marked with a scene label, and the scene label indicates a scene to which the pixel belongs.

The computer device may obtain multiple data sets, and obtain the multiple sample images from the multiple data sets. Each data set may include multiple candidate sample images, and the multiple candidate sample images may be images of multiple scenes, for example, may include at least one of a wall image, a ground image, and a ceiling image. A model can obtain a variety of image information by performing model training according to the images of various scenes, so that rich scene features are learned, and robustness of the deep neural network is improved. When scene segmentation is performed according to the deep neural network with better robustness, accuracy of indoor scene segmentation can be improved.

For example, the multiple data sets may include an enterprise data set, a scannet data set (a large-scale data set marked with 3D indoor scene reconstruction information, a data stream thereof about 1.07 million), a 2D-3D-s data set (a data set with a data volume of about 37,000) and a NYUv2 data set (a data set with a data volume of about 1450). The multiple data sets can include a total of 1.14 million candidate sample images.

In some possible embodiments, a corresponding sampling weight may be assigned to each data set according to a quantity of candidate sample images in each data set, and the data sets are sampled according to sampling weights of the data sets to obtain the multiple sample images.

The sampling weight of each data set is negatively corrected to the quantity of candidate sample images in the data set. That is, if a certain data set is larger, for example, the data set includes more candidate sample images, a sampling weight of the data set is smaller, and a ratio between a quantity of candidate sample images obtained by sampling from the data set and the quantity of candidate sample images in the data set is smaller. If a certain data set is smaller, for example, the data set includes fewer candidate sample images, a sampling weight of the data set is larger, and a ratio between a quantity of candidate sample images obtained by sampling from the data set and the quantity of candidate sample images in the data set is smaller.

Such a sampling method is used, so that a quantity of sample images obtained from each data set can be controlled by using sampling weights in scenes with different data sets having different sizes. Sampling is performed according to different sampling weights, so that it is ensured that sample images in a data set with a larger amount of data is not too more, and sample images from a data set with a smaller amount of data are not too few. In this way, a relative balance between the data set with a larger amount of data and the data set with a smaller amount of data is maintained, and a problem of imbalance of the data sets can be effectively solved.

In S72: the computer device performs data enhancement on the multiple sample images.

In some possible embodiments, the computer device may randomly select a part of the sample images from the multiple sample images, and perform data enhancement on the selected part of the sample images. In other possible embodiments, the computer device may perform data enhancement on each of the multiple sample images.

The manner of data enhancement includes, but is not limited to, any one or combination of the following manners (1) to (9):
(1) Rotate the multiple sample images;
(2) Overturn the multiple sample images;
(3) Translate the multiple sample images;
(4) Transform colors of the multiple sample images;
(5) Transform brightness of the multiple sample images;
(6) Transform contrast of the multiple sample images;
(7) Add random noise to the multiple sample images;
(8) Crop the multiple sample images;
(9) Stretch the multiple sample images.

In a process of training the deep neural network, the robustness of the deep neural network can be enhanced by performing data enhancement, so that the deep neural network is less affected by interference of external factors. In addition, an amount of training data can be increased, and a generalization ability of the model can be improved.

In S73: the computer device performs model training on an initial deep neural network based on the multiple sample images to obtain the deep neural network. The initial deep neural network includes a down-sampling module, an atrous spatial pyramid pooling module, and an up-sampling module.

In a process of model training, a cross-entropy loss function can be used as a loss function, and an optimizer can use an Adam optimizer to update parameters of the model. The Adam optimizer is an optimizer that comprehensively considers a first moment estimation (that is, a mean of a gradient) and a second moment estimation (that is, an un-centralized variance of a gradient) of a gradient to calculate an update stride. When performance of the model is evaluated, intersection-over-union, (IoU) of a wall, IoU of a ground, IoU of a ceiling, and IoU of other scenes can be used, and a mean of IoU of the wall, IoU of the ground, IoU of the ceiling, and IoU of other scenes can further obtained to obtain mean intersection-over-union (mIoU), so that performance of different models are compared.

Figure 8:
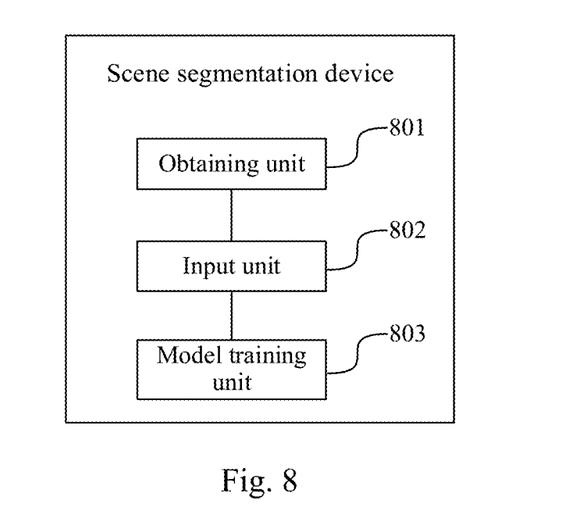
FIG. 8 is a block diagram of a scene segmentation device according to an exemplary embodiment.

FIG. 8 is a block diagram of a scene segmentation device according to an exemplary embodiment. Referring to FIG. 8, the device includes an obtaining unit 801, an input unit 802, and a model computation unit 803.

The obtaining unit 801 is configured to obtain an image to be identified.

The input unit 802 is configured to input the image into a deep neural network. The deep neural network includes a down-sampling module, an atrous spatial pyramid pooling module, an up-sampling module, and a classification module. The down-sampling module and the up-sampling module use a depthwise separable convolutional structure.

The model computation unit 803 is configured to: perform depthwise separable convolution on the image by using the down-sampling module, to obtain a first characteristic image smaller than the image in size, perform atrous convolution on the first characteristic image by using the atrous spatial pyramid pooling module, to obtain second characteristic images with different scales, performing depthwise separable convolution on the second characteristic images with different scales by using the up-sampling module, to obtain a third characteristic image with the same size as the image, and classifying pixels in the third characteristic image by using the classification module, to obtain a scene segmentation result of the image.

In a possible implementation, the down-sampling module includes a convolutional layer having a stride greater than 1.

In a possible implementation, the up-sampling module and the down-sampling module are connected in a cross-layer manner.

In a possible implementation, the up-sampling module includes at least one first up-sampling module and at least one second up-sampling module, an input of the first up-sampling module is a stitching result of a characteristic image outputted by the second up-sampling module and the first characteristic image, and the second up-sampling module is a previous up-sampling module of the first up-sampling module.

In a possible implementation, the obtaining unit is further configured to obtain multiple sample images, each pixel of each sample image is marked with a scene label, and the scene label indicates a scene to which the pixel belongs.

The input unit is configured to input the image into an initial deep neural network, the initial deep neural network includes a down-sampling module, an atrous spatial pyramid pooling module, an up-sampling module, and a classification module, and the down-sampling module and the up-sampling module use a depthwise separable convolution structure.

The device further includes a model training unit, configured to perform model training on the initial deep neural network based on the multiple sample images, to obtain the deep neural network.

In a possible implementation the device further includes:
a data enhancement unit, configured to perform data enhancement on the multiple sample images.

In a possible implementation, the obtaining unit 801 is specifically configured to: obtain multiple data sets, where each data set includes multiple candidate sample images; allocate a corresponding sampling weight to each data set according to a quantity of candidate sample images in each data set, where the sampling weight corresponding to the data set is negatively correlated to the quantity of candidate sample images in the data set; and sample each data set according to the sampling weight of each data set, to obtain the multiple sample images.

With respect to the scene segmentation device in the above embodiment, specific manners in which units perform operations are described in detail in the embodiment relating to the scene segmentation method, and details are not described herein.

Figure 9:
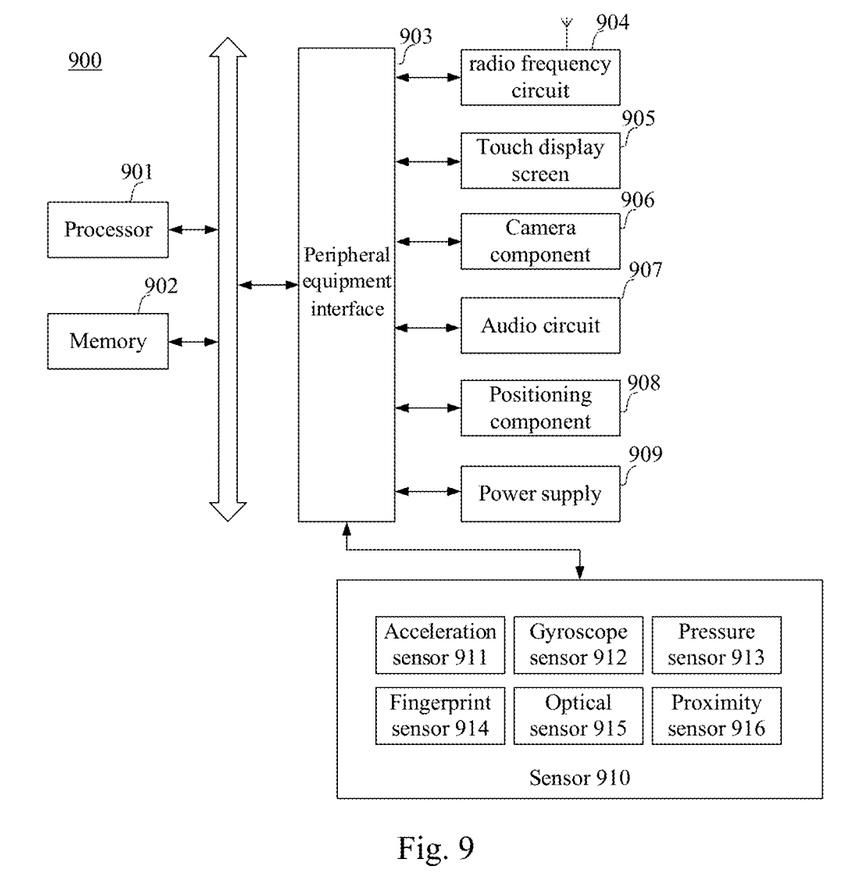
FIG. 9 is a block diagram of a terminal according to an exemplary embodiment.

The method provided by the embodiment of the present disclosure may be implemented to a computer device. The computer device may be implemented as a terminal. For example, FIG. 9 shows a structural block diagram of a terminal 900 according to an exemplary embodiment of the present disclosure. The terminal 900 may be: a smartphone, a tablet computer, an MP3 player (Moving Picture Experts Group Audio Layer III), and an MP4 (Moving Picture Experts Group Audio Layer IV) Player, a notebook computer, or a desktop computer. The terminal 900 may also be called other names such as user equipment, a portable terminal, a laptop terminal, and a desktop terminal.

Generally, the terminal 900 includes a processor 901 and a memory 902.

The processor 901 may include one or more processing cores, such as a 4-core processor and an 8-core processor. The processor 901 may be implemented by using at least one hardware form of digital signal processing (DSP), a field-programmable gate array (FPGA), and a programmable logic array (PLA). The processor 901 may also include a main processor and a coprocessor. The main processor is a processor for processing data in a wake state, and is also called a CPU (Central Processing Unit); the coprocessor is low-power-consumption processor for processing data in a standby state. In some embodiments, the processor 901 may be integrated with a GPU (Graphics Processing Unit), and the GPU is responsible for rendering and drawing content required to be displayed on a display screen. In some embodiments, the processor 901 may further include an AI (Artificial Intelligence) processor, and the AI processor is configured to process a computing operation related to machine learning.

The memory 902 may include one or more computer-readable storage media. The computer-readable storage media may be non-transitory. The memory 902 may further include a high-speed random access memory, and a non-volatile memory, such as one or more disk storage devices or flash storage devices. In some embodiments, a non-transitory computer-readable storage medium in the memory 902 is used to store at least one instruction, and the at least one instruction is used to be executed by the processor 901 to implement the scene segmentation method provided by the method embodiment in the present disclosure.

In some embodiments, the terminal 900 may further optionally include a peripheral device interface 903 and at least one peripheral device. The processor 901, the memory 902, and the peripheral device interface 903 may be connected through a bus or a signal line. Each peripheral device can be connected to the peripheral device interface 903 through a bus, a signal line, or a circuit board. Specifically, the peripheral device includes at least one of a radio frequency circuit 904, a touch display screen 905, a camera 906, an audio circuit 907, a positioning component 908, and a power supply 909.

The peripheral device interface 903 may be used to connect at least one peripheral device related to I/O (Input/Output) to the processor 901 and the memory 902. In some embodiments, the processor 901, the memory 902, and the peripheral device interface 903 are integrated on a same chip or circuit board. In some other embodiments, any one or two of the processor 901, the memory 902, and the peripheral device interface 903 can be implemented on a separate chip or circuit board, which is not limited by the present embodiment.

The radio frequency circuit 904 is configured to receive and transmit an RF (Radio Frequency) signal, also called an electromagnetic signal. The radio frequency circuit 904 communicates with a communication network and other communication devices through the electromagnetic signal. The radio frequency circuit 904 converts an electrical signal into an electromagnetic signal for transmission, or converts a received electromagnetic signal into an electrical signal. Optionally, the radio frequency circuit 904 includes: an antenna system, an RF transceiver, one or more amplifiers, a tuner, an oscillator, a digital signal processor, a coder-decoder chipset, a subscriber identity module card, and the like. The radio frequency circuit 904 can communicate with other terminals through at least one wireless communication protocol. The wireless communication protocol includes, but is not limited to, the World Wide Web, a metropolitan area network, an intranet, mobile communication networks of all generations (2G, 3G, 4G, and 5G), a wireless local area network, and/or a WiFi (Wireless Fidelity) network. In some embodiments, the radio frequency circuit 904 may further include a circuit related to NFC (Near Field Communication), which is not limited by the present disclosure.

The display screen 905 is used to display a UI (User Interface). The UI can include graphics, text, icons, videos, and any combination thereof. When the display screen 905 is a touch display screen, the display screen 905 further has an ability to collect a touch signal on or above a surface of the display screen 905. The touch signal may be taken as a control signal to be inputted into the processor 901 for processing. In this case, the display screen 905 may further be used to provide a virtual button and/or a virtual keyboard that is also called a soft button and/or a soft keyboard. In some embodiments, there may be one display screen 905, and a front panel of the terminal 900 is provided. In other embodiments, there may be at least two display screens 905, and the at least two display screens are separately arranged on different surfaces of the terminal 900 or are arranged in a folding manner. In other embodiments, the display screen 905 may be a flexible display screen arranged on a curved surface or a folded surface of the terminal 900. Furthermore, the display screen 905 can further be set in a non-rectangular irregular shape, that is, a special-shaped screen. The display screen 905 even may be made of materials such as an LCD (Liquid Crystal Display) and an OLED (Organic Light-Emitting Diode).

The camera component 906 is used to capture images or videos. Optionally, the camera component 906 includes a front camera and a rear camera. Generally, the front camera is arranged on the front panel of the terminal, and the rear camera is arranged on the back of the terminal. In some embodiments, at least two rear cameras are provided, each of the rear cameras is any one of a main camera, a depth-of-field camera, a wide-angle camera, and a telephoto camera, so as to implement integration of the main camera and the depth-of-field camera to realize a bokeh function, and implement integration of the main camera and the wide-angle camera to realize panoramic shooting and VR (Virtual Reality) shooting functions or another fusion shooting function. In some embodiments, the camera assembly 906 may further include a flash. The flash can be a monochrome temperature flash or a dual-color temperature flash. The dual-color temperature flash is a combination of a warm light flash and a cold light flash, and can be used for light compensation at different color temperatures.

The audio circuit 907 may include a microphone and a speaker. The microphone is used to collect sound waves of a user and an environment, and convert the sound waves into electrical signals and input the electrical signals to the processor 901 for processing, or input the electrical signals to the radio frequency circuit 904 to implement voice communication. For a purpose of stereo collection or noise reduction, multiple microphones may be provided and are separately arranged at different parts of the terminal 900. The microphone can further be an array microphone or an omnidirectional acquisition microphone. The speaker is used to convert the electrical signals from the processor 901 or the radio frequency circuit 904 into sound waves. The speaker can be a traditional film speaker or a piezoelectric ceramic speaker. When the speaker is a piezoelectric ceramic speaker, the speaker can not only convert electrical signals into sound waves audible to humans, but also convert electrical signals into sound waves inaudible to humans for purposes of ranging, and the like. In some embodiments, the audio circuit 907 may further include a headphone jack.

The positioning component 908 is configured to locate a current geographical position of the terminal 900 to implement navigation or an LBS (Location Based Service). The positioning component 908 may be a positioning component based on an American GPS (Global Positioning System), a Chinese BeiDou system, or a Russian Galileo system.

The power supply 909 is used to supply power to various components in the terminal 900. The power supply 909 may be an alternating current, a direct current, a disposable battery, or a rechargeable battery. When the power supply 909 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery can also be used to support a fast charging technology.

In some embodiments, the terminal 900 further includes one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 can detect accelerations on three coordinate axes of a coordinate system established by the terminal 900. For example, the acceleration sensor 911 may be used to detect components of gravity accelerations on the three coordinate axes. The processor 901 may control the touch display screen 905 to display a user interface in a landscape view or a portrait view according to a gravity acceleration signal collected by the acceleration sensor 911. The acceleration sensor 911 may also be used to collect motion data of a game or a user.

The gyroscope sensor 912 can detect a body direction and a rotation angle of the terminal 900, and the gyroscope sensor 912 can cooperate with the acceleration sensor 911 to collect a 3D motion of the user on the terminal 900. Based on the data collected by the gyroscope sensor 912, the processor 901 can realize following functions: motion sensing (such as changing the UI according to a tilt operation of the user), image stabilization during shooting, game control, and inertial navigation.

The pressure sensor 913 may be arranged on a side frame of the terminal 900 and/or a lower layer of the touch display screen 905. When the pressure sensor 913 is arranged on the side frame of the terminal 900, a holding signal applied to the terminal 900 by the user can be detected, and the processor 901 performs left-right hand recognition or quick operation according to the holding signal collected by the pressure sensor 913. When the pressure sensor 913 is arranged on the lower layer of the touch display screen 905, the processor 901 controls an operable control on the UI according to pressure operation on the touch display screen 905 by the user. The operable control includes at least one of a button control, a scroll bar control, an icon control, and a menu control.

The fingerprint sensor 914 is used to collect a fingerprint of the user, and the processor 901 identifies an identity of the user based on the fingerprint collected by the fingerprint sensor 914, or the fingerprint sensor 914 identifies the identity of the user based on the collected fingerprint. When the identity of the user is identified as a trusted identity, the processor 901 authorizes the user to perform related sensitive operations, such as unlocking the screen, viewing encrypted information, downloading software, paying, and changing settings. The fingerprint sensor 914 may be arranged on the front, back, or side of the terminal 900. When a physical button or a manufacturer's logo is set on the terminal 900, the fingerprint sensor 914 can be integrated with the physical button or the manufacturer's logo.

The optical sensor 915 is used to collect ambient light intensity. In one embodiment, the processor 901 may control display brightness of the touch display screen 905 according to the ambient light intensity collected by the optical sensor 915. Specifically, when the ambient light intensity is high, the display brightness of the touch display screen 905 is increased. When the ambient light intensity is low, the display brightness of the touch display screen 905 is reduced. In another embodiment, the processor 901 may further dynamically adjust shooting parameters of the camera component 906 according to the ambient light intensity collected by the optical sensor 915.

The proximity sensor 916, also called a distance sensor, is usually arranged on the front panel of the terminal 900. The proximity sensor 916 is used to collect a distance between the user and a front side of the terminal 900. In one embodiment, when the proximity sensor 916 detects that the distance between the user and the front side of the terminal 900 gradually becomes shorter, the processor 901 controls the touch display screen 905 to switch from a screen unlocking state to a screen locking state. When the distance between the user and the front side of the terminal 900 gradually becomes longer, the processor 901 controls the touch display screen 905 to switch from a screen locking state to a screen unlocking state.

Those skilled in the art can understand that the structure shown in FIG. 9 does not constitute a limitation on the terminal 900, and may include more or fewer components than shown in the figure, or combine certain components, or adopt different component arrangements.

Figure 10:
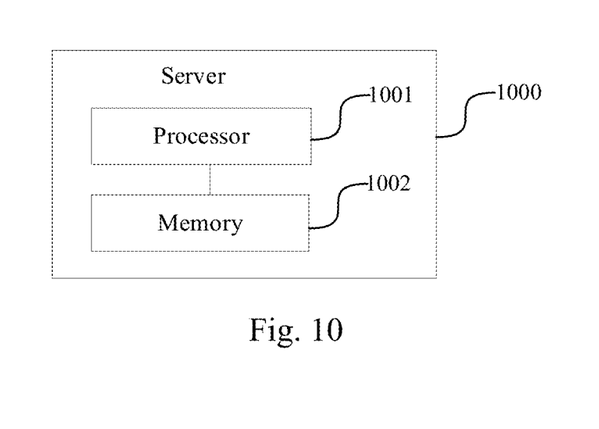
FIG. 10 is a block diagram of a server according to an exemplary embodiment.

The method provided by the embodiment of the present disclosure may be implemented on a computer device, and the computer device may be implemented as a server. For example, FIG. 10 is a schematic structural diagram of a server according to an embodiment of the present disclosure. Relatively large differences in a server 1000 may occur due to different configurations or performances. The server 1000 may include one or more central processing units (CPU) 1001 and one or more memories 1002. At least one instruction is stored in the memory 1002, and the at least one instruction is loaded and executed by the central processing unit 1001 to implement the scene segmentation methods provided by the above method embodiments. Certainly, the server may further have components such as a wired or wireless network interface and an input-output interface to facilitate inputting and outputting. The server may further include other components for implementing device functions, which is not described herein.

In an exemplary embodiment, a storage medium including an instruction, such as a memory including an instruction, is further provided, and the above instruction may be executed by a processor of a computer device to complete the above scene segmentation method. Optionally, the storage medium may be a non-transitory computer-readable storage medium, for example, the non-transitory computer-readable storage medium may be a read-only memory (ROM), a random access memory (RAM), compact disc read-only memory (CD-ROM), a magnetic tape, a floppy disk, and an optical data storage device.

In an exemplary embodiment, a computer program product is further provided, including one or more instructions. When the one or more instructions are executed by a processor of a computer device, the computer device can execute the above scene segmentation method.

Other embodiments of the present disclosure readily come to the mind of those skilled in the art after the specification is considered and the embodiments disclosed herein are practiced. The present disclosure is intended to cover any variations, uses, or adaptations of the present disclosure that conform to the general principles of the present disclosure and include the common general knowledge or conventional technical means in the technical field not disclosed by the present disclosure. The specification and embodiments are merely exemplary, and a true scope and spirit of the disclosure are indicated by the following claims.

It should be understood that the present disclosure is not limited to the precise structure described above and shown in the accompanying drawings, and various modifications and changes may be made without departing from the scope of the present disclosure. The scope of the present disclosure is limited only by the appended claims.

The invention claimed is:

1. A scene segmentation method, comprising:
obtaining an image to be identified;
inputting the image into a deep neural network, wherein the deep neutral network comprises a down-sampling module, an atrous spatial pyramid pooling module, an up-sampling module, and a classification module, and the down-sampling module and the up-sampling module use a depthwise separable convolution structure; and
performing a depthwise separable convolution on the image by using the down-sampling module, to obtain a first characteristic image smaller than an input image in size, performing an atrous convolution on the first characteristic image by using the atrous spatial pyramid pooling module, to obtain second characteristic images with different scales, performing a depthwise separable convolution on the second characteristic images with different scales by using the up-sampling module, to obtain a third characteristic image with a same size as the input image, and classifying pixels in the third characteristic image by using the classification module, to obtain a scene segmentation result of the input image.

2. The scene segmentation method according to claim 1, wherein the down-sampling module comprises a convolutional layer with a stride greater than 1.

3. The scene segmentation method according to claim 1, wherein the up-sampling module and the down-sampling module are connected in a cross-layer manner.

4. The scene segmentation method according to claim 3, wherein the up-sampling module comprises at least one first up-sampling module and at least one second up-sampling module, an input of the first up-sampling module is a stitching result of a characteristic image outputted by the second up-sampling module and the first characteristic image, and the second up-sampling module is a previous up-sampling module of the first up-sampling module.

5. The scene segmentation method according to claim 1, wherein before the obtaining an image to be identified, the method further comprises:
obtaining multiple sample images, wherein each pixel of the multiple sample images is marked with a scene label, and the scene label indicates a scene to which said each pixel belongs;
calling an initial deep neural network, wherein the initial deep neural network comprises a down-sampling module, an atrous spatial pyramid pooling module, an up-sampling module, and a classification module, and the down-sampling module and the up-sampling module use a depthwise separable convolution structure; and
performing a model training on the initial deep neural network based on the multiple sample images to obtain the deep neural network.

6. The scene segmentation method according to claim 5, wherein before the obtaining an image to be identified, the method further comprises
performing data enhancement on the multiple sample images.

7. The scene segmentation method according to claim 5, wherein the obtaining multiple sample images comprises:
obtaining multiple data sets, wherein each of the data sets comprises multiple candidate sample images;
allocating a corresponding sampling weight to each of the data sets according to a quantity of candidate sample images in each of the data sets, wherein the sampling weight corresponding to each of the data sets is negatively correlated to the quantity of candidate sample images in each of the data set; and
sampling each of the data sets according to the sampling weight of each of the data sets to obtain the multiple sample images.

8. A scene segmentation device, comprising:
at least one processor; and
at least one memory configured to store a processor-executable instruction, wherein
the at least one processor is configured to execute the processor-executable instruction to implement the scene segmentation method according to claim 1.

9. The scene segmentation device according to claim 8, wherein the down-sampling module comprises a convolutional layer with a stride greater than 1.

10. The scene segmentation device according to claim 8, wherein the up-sampling module and the down-sampling module are connected in a cross-layer manner.

11. The scene segmentation device according to claim 10, wherein the up-sampling module comprises at least one first up-sampling module and at least one second up-sampling module, an input of the first up-sampling module is a stitching result of a characteristic image outputted by the second up-sampling module and the first characteristic image, and the second up-sampling module is a previous up-sampling module of the first up-sampling module.

12. The scene segmentation device according to claim 8, wherein the at least one processor is configured to execute the processor-executable instruction to perform followings before the obtaining an image to be identified:
obtaining multiple sample images, wherein each pixel of the multiple sample images is marked with a scene label, and the scene label indicates a scene to which said each pixel belongs;
calling an initial deep neural network, wherein the initial deep neural network comprises a down-sampling module, an atrous spatial pyramid pooling module, an up-sampling module, and a classification module, and the down-sampling module and the up-sampling module use a depthwise separable convolution structure; and
performing a model training on the initial deep neural network based on the multiple sample images to obtain the deep neural network.

13. The scene segmentation device according to claim 12, wherein the at least one processor is configured to execute the processor-executable instruction to perform followings before the obtaining an image to be identified:
performing data enhancement on the multiple sample images.

14. The scene segmentation device according to claim 12, wherein the at least one processor is further configured to execute the processor-executable instruction to:
obtain multiple data sets, wherein each of the data sets comprises multiple candidate sample images;
allocate a corresponding sampling weight to each of the data sets according to a quantity of candidate sample images in each of the data sets, wherein the sampling weight corresponding to each of the data sets is negatively correlated to the quantity of candidate sample images in each of the data set; and sample each of the data sets according to the sampling weight of each of the data sets to obtain the multiple sample images.

15. A non-transitory computer-readable storage medium, storing an instruction, wherein in response to that the instruction is executed by a processor of a computer device, the computer device performs the scene segmentation method according to claim 1.

* * * * *